US007237102B2

(12) United States Patent
Rothman (10) Patent No.: US 7,237,102 B2
(45) Date of Patent: Jun. 26, 2007

(54) METHODS AND APPARATUS FOR CONFIGURING HARDWARE RESOURCES IN A PRE-BOOT ENVIRONMENT WITHOUT REQUIRING A SYSTEM RESET

(75) Inventor: Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 469 days.

(21) Appl. No.: 10/283,920

(22) Filed: Oct. 30, 2002

(65) Prior Publication Data

US 2004/0088531 A1 May 6, 2004

(51) Int. Cl.
G06F 9/00 (2006.01)
G06F 9/24 (2006.01)
G06F 15/177 (2006.01)

(52) U.S. Cl. .............................. 713/1; 713/2; 713/100
(58) Field of Classification Search .................. 713/1, 713/2, 100
See application file for complete search history.

(56) References Cited

U.S. PATENT DOCUMENTS

| | | | | |
|---|---|---|---|---|
| 5,504,905 A | * | 4/1996 | Cleary et al. ............... | 713/100 |
| 5,684,945 A | * | 11/1997 | Chen et al. .................. | 714/20 |
| 5,748,980 A | * | 5/1998 | Lipe et al. .................... | 710/8 |
| 5,964,855 A | | 10/1999 | Bass et al. | |
| 6,032,239 A | * | 2/2000 | Beelitz ........................ | 711/173 |
| 6,041,375 A | | 3/2000 | Bass et al. | |
| 6,122,733 A | * | 9/2000 | Christeson et al. .......... | 713/2 |
| 6,148,387 A | * | 11/2000 | Galasso et al. ............. | 711/203 |
| 6,263,378 B1 | * | 7/2001 | Rudoff et al. ............... | 719/327 |
| 6,272,629 B1 | * | 8/2001 | Stewart ........................ | 713/2 |
| 6,326,973 B1 | * | 12/2001 | Behrbaum et al. .......... | 345/532 |
| 6,353,885 B1 | * | 3/2002 | Herzi et al. .................. | 713/1 |
| 6,367,074 B1 | * | 4/2002 | Bates et al. ................. | 711/170 |
| 6,505,298 B1 | | 1/2003 | Cerbini et al. | |
| 6,564,318 B1 | * | 5/2003 | Gharda et al. ................ | 713/2 |
| 6,580,219 B1 | * | 6/2003 | Jones et al. .................. | 315/80 |
| 6,754,817 B2 | * | 6/2004 | Khatri et al. ................. | 713/1 |
| 6,892,297 B1 | * | 5/2005 | Aguilar et al. ............... | 713/2 |
| 6,931,440 B1 | * | 8/2005 | Blumenau et al. ........... | 709/220 |
| 7,036,005 B2 | * | 4/2006 | Nalawadi et al. ............ | 713/1 |
| 2002/0087855 A1 | * | 7/2002 | Dykes et al. ................. | 713/2 |
| 2003/0005277 A1 | * | 1/2003 | Harding et al. .............. | 713/2 |
| 2004/0215354 A1 | * | 10/2004 | Nakamura et al. ........... | 700/21 |
| 2004/0215954 A1 | * | 10/2004 | Piwonka ..................... | 713/100 |
| 2004/0236936 A1 | * | 11/2004 | Bulusu et al. ................ | 713/2 |
| 2004/0268116 A1 | * | 12/2004 | Vasisht et al. ............... | 713/100 |

* cited by examiner

*Primary Examiner*—Rehana Perveen
*Assistant Examiner*—Michael J. Brown
(74) *Attorney, Agent, or Firm*—Marshall, Gerstein & Borun LLP

(57) ABSTRACT

Methods and apparatus for configuring a hardware device in a pre-boot environment are disclosed. For example, a configuration manager is provided for use in a computer having a processor. The example configuration manager includes an interrupt monitoring agent in communication with a controller to monitor the computer and a driver manager in communication with the controller to load a driver. The configuration manager also includes a firmware interface database agent in communication with the controller to store a set of configuration data for the driver and a user interface in communication with the controller to provide a user with options to modify the set of configuration data.

37 Claims, 6 Drawing Sheets

METHODS AND APPARATUS FOR CONFIGURING HARDWARE RESOURCES IN A PRE-BOOT ENVIRONMENT WITHOUT REQUIRING A SYSTEM RESET

FIELD OF THE DISCLOSURE

The patent relates generally to hardware management for an interface between an operating system and a platform's firmware, and more particularly, to methods and apparatus for configuring hardware resources in a pre-boot environment, without requiring a system reset.

BACKGROUND

The boot environment for computers presents significant challenges to innovation within the hardware and software industries. Each new platform capability or hardware innovation requires firmware developers to craft increasingly complex solutions, and often requires Operating System (OS) developers to make changes to their boot code before customers can benefit from the innovation. This can be a time-consuming process requiring a significant investment of resources. The hardware and software industries have attempted to allow the platform and OS to evolve and innovate independently of one another.

To permit such independent innovation and maintain necessary communication between an OS and platform firmware (any software that is included in read-only memory (ROM)), an interface having an additional layer of firmware code provides for the abstraction of the OS and all higher level software from the firmware. The interface operates in what is referred to as a pre-boot environment. Previous attempts to develop such an interface have required the OS to have specific knowledge of the workings of certain hardware devices. Previous attempts at developing the interface were not effective and did not allow for the dynamic management of those devices in the pre-boot environment.

Specifically, when configuring hardware devices in the pre-boot environment, previous solutions required a total system reset to make the configuration changes activate. Thus, no previous solutions exist to activate configuration changes without restarting the entire system. This deficiency found in previous systems is highlighted by the fact that most changes in a system do not typically require a system reset which can take a long period of time. All classes of machines can benefit from configuring hardware devices without requiring a total system reset, but the benefit becomes much more pronounced when enterprise class systems are considered that take many minutes to go through a total reset.

DESCRIPTION OF VARIOUS EMBODIMENTS

The present patent describes methods and an apparatus to configure individual hardware devices in a pre-boot environment and intelligently determine if a total system reset is required to activate one or more changes to the configuration. If a system reset is not required, the configuration changes may be activated with the use of a firmware interface such as an Extensible Firmware Interface (EFI) to stop a driver associated with a particular hardware device and restart it so that it re-initializes with the appropriate configuration changes.

Figure 1:
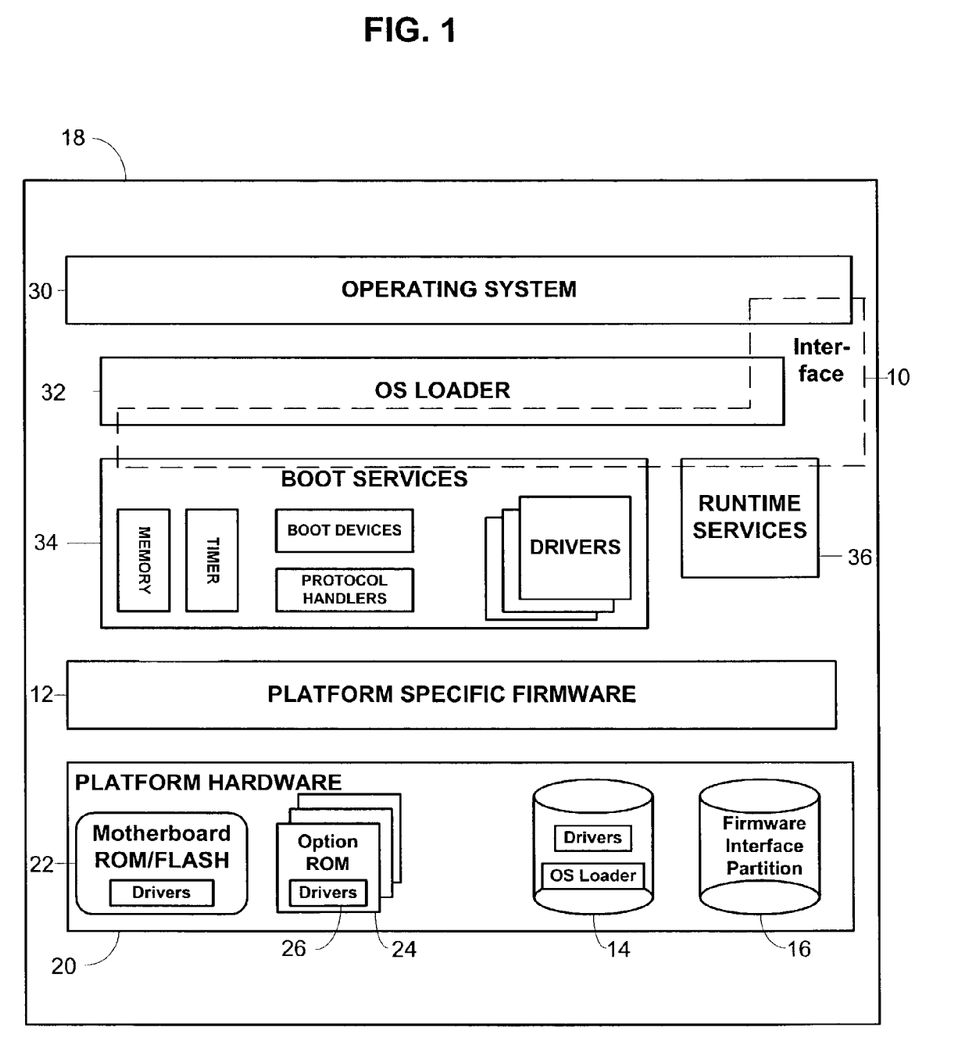
FIG. 1 illustrates some of the principal components of an embodiment of a firmware interface and their relationship to platform hardware and OS software.

FIG. 1 is a block diagram of several components of an embodiment of an interface 10 constructed in accordance with the teachings of the patent.

This diagram illustrates the interactions of the various components accessed by the interface 10 to accomplish platform and OS boot. The platform firmware 12 is able to retrieve an OS loader image 14 from an interface system partition 16. The hardware and software components illustrated in FIG. 1 are some of the integral components of a computer (i.e. machine) 18.

The interface system partition 16 is one of several components included in the platform hardware 20. The platform hardware 20 includes several machine-accessible medium including a motherboard flash memory 22, a plurality of option Read Only Memories (ROMs) 24. The platform hardware also includes a plurality of drivers 26 that are modules of code typically inserted into the firmware via protocol interfaces. A protocol is akin to a C++ Class and is a collection of read-only data and a collection of callable interfaces. The interfaces are similar to C++ methods and are named by 16-byte unique identifiers, also known as Globally Unique Ids (GUIDs).

The drivers 26 are the control mechanisms for attached hardware devices and are typically embedded in the corresponding hardware option ROM 24 or flash memory 22. Some of the drivers 26 pass a set of data to a central firmware interface database (see FIG. 3). This data includes interpretable byte streams of data which signify the questions to ask a user to make changes to the configuration of the drivers 26. This data may be referred to as "op-code" and also includes a flag setting which indicates whether a change to a particular op-code requires a system reset, a restart to a particular driver 26, or no action at all. This will be described in more detail with reference to FIGS. 3 and 4. It should also be noted that interface drivers may provide device support during the boot process or they may provide platform services. In contrast, OS drivers are loaded to provide device support once the OS 30 takes control of the platform hardware 20.

A variety of mass storage devices including, for example, disk, compact disk (CD) drives and digital versatile disk (DVD) drives may be supported by the interface 10 to boot the OS 30. The OS 30 may also be remotely booted via a network. Persons of ordinary skill in the art will appreciate that other boot media types may be added to the platform hardware 20.

The interface 10 communicates with an OS loader 32. Once started, the OS loader 32 continues to boot the complete operating system 30. To do so, the OS loader 32 uses the interface boot services 34 and the interface 10 to survey, comprehend and initialize the various platform components and the OS software that manages them. Interface runtime services 36 are also available to the OS loader 32 during the boot phase. It should be noted that the interface 10 supports platform hardware architecture that has 32 and/or 64 bit instruction capabilities, as well as being easily adapted for use on other architectures.

The computer 18 of the instant example includes a few additional hardware components found in conventional computers, such as, for example, personal computers, laptops, notebooks, servers, etc. The computer 18 may optionally include modifications to that conventional construction as explained in detail below. Thus, as shown in FIG. 2, the computer 18 includes a central processing unit 40 which is implemented, for example, by one or more Intel® microprocessors from the Pentium® family, the Itanium™ family, the XScale™ family or any other family of microprocessors.

In the illustrated example, the interface 10 is Intel's Extensible Firmware Interface (hereafter "EFI") which is an open extensible interface that lends itself to the creation of platform drivers. These drivers may be analogous to OS drivers, providing support for new device types during the boot process, or they may be used to implement enhanced platform capabilities such as fault tolerance or security. The EFI 10 helps developers avoid many of the frustrations inherent in trying to squeeze new code into a traditional Basic Input/Output System (hereafter "BIOS") environment. BIOS may be described in most instances as a collection of low-level service routines. As previously discussed, the EFI gives firmware developers an infrastructure to add capability to the platform in a modular way. The drivers may be implemented using high level coding languages because of the calling conventions and environment provided by the EFI. This in turn may help to reduce the difficulty and cost of innovation. The option of the Interface Partition 16 shown in FIG. 1 (which is a segment of a partition of, for example, a hard disk drive), provides an alternative to non-volatile memory storage for such extensions.

Figure 2:
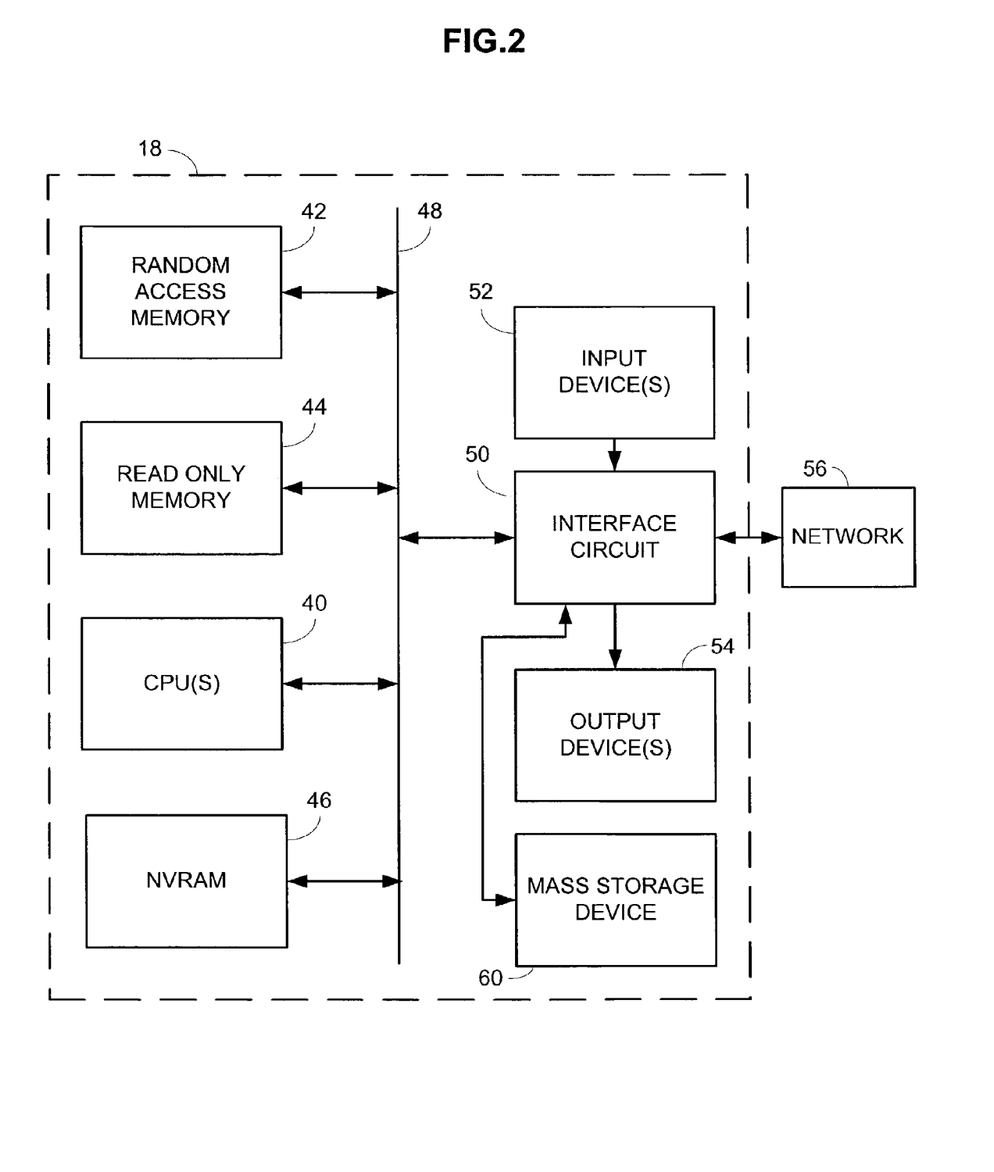
FIG. 2 is a block diagram of an example computer utilizing the components of FIG. 1.

Referring to FIG. 2, as is conventional, the central processing unit 40 of the computer 18 is in communication with a number of machine-accessible medium including a volatile memory 42, a non-volatile memory 44, and a non-volatile random access memory (NVRAM) 46 via a bus 48. The volatile memory may be implemented by SDRAM, DRAM, RAMBUS or any other type of random access memory device. The non-volatile memory 44 may be implemented by flash memory, option-ROMs, or any other desired type of memory device. Access to the memory 42 is typically controlled by a memory controller (not shown) in a conventional manner.

The computer 18 also includes a conventional interface circuit 50. The interface circuit 50 may be implemented by any type of well known interface standard, such as an Ethernet interface, a universal serial bus (USB) and/or a third generation input/output (3GIO) interface (also known as PCI Express).

One or more input devices 52 generically referred to herein as hardware devices, are connected to the interface circuit 50. The input device(s) 52 permit a user to enter data and commands into the CPU 40. The input device(s) 52 can be implemented by, for example, a keyboard, a mouse, a touch screen, a track-pad, a trackball, isopoint and/or a voice recognition system.

One or more output devices 54, also generically referred to herein as hardware devices, are also connected to the interface circuit 50. The output devices 54 can be implemented, for example, by display devices, a printer and/or speakers. The interface circuit 50 would, thus, typically include a graphics driver card.

The interface circuit 50 may also include a communication device such as a modem or network interface card to facilitate exchange of data with external computers via a network 56 (e.g., an Ethernet connection, a digital subscriber line (DSL), a telephone line, coaxial cable, a cellular telephone system, etc.). Typically, the computer 18 also includes one or more mass storage devices 60 for storing software and data. Examples of such mass storage devices include floppy disk drives, hard drive disks, compact disk drives and DVD drives.

Figure 3:
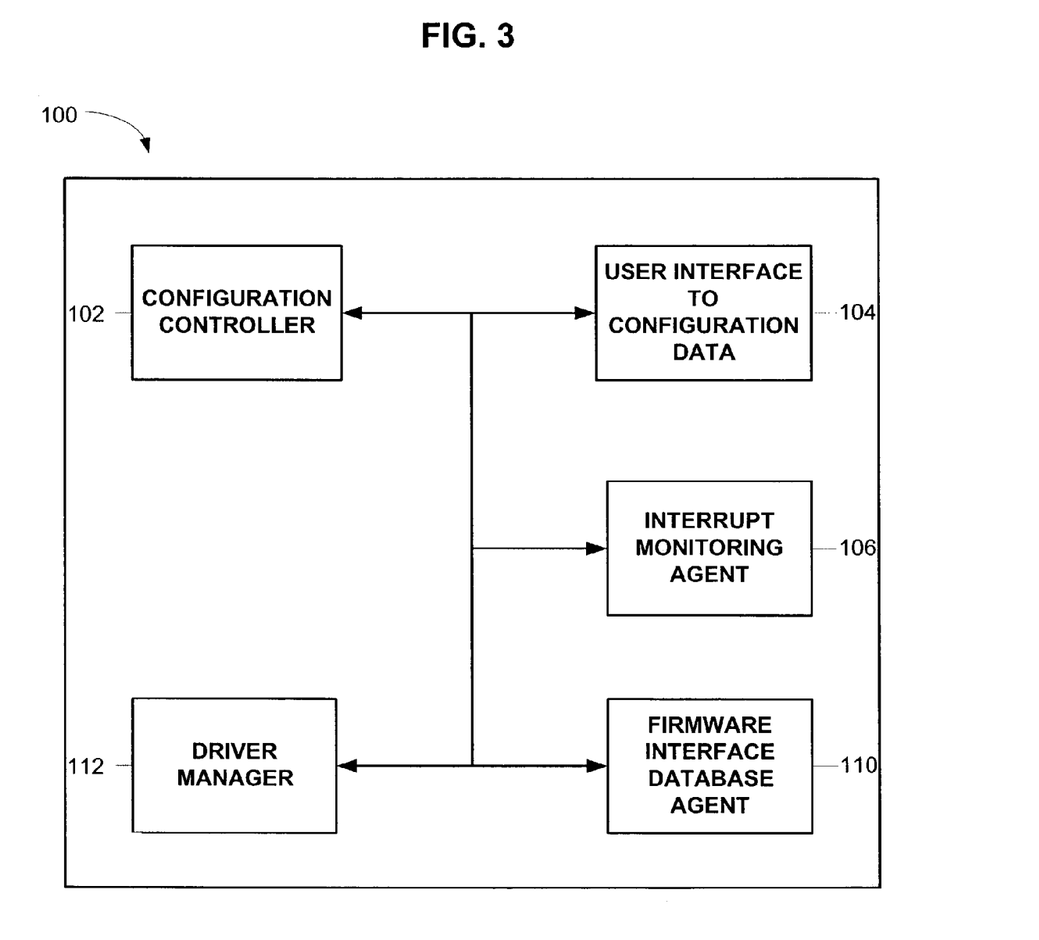
FIG. 3 is a schematic illustration showing an embodiment of a firmware interface configuration manager constructed in accordance with the teachings of the patent.

The interface 10 for the computer 18 shown in FIG. 1 includes a configuration manager 100 to configure hardware devices in the pre-boot environment. FIG. 3 illustrates schematically an embodiment of the configuration manager 100 to dynamically manage a plurality of hardware devices before the operating system 30 is loaded. The configuration manager 100 manages the hardware devices with a configuration controller 102 that communicates with a user interface 104, an interrupt monitoring agent 106, and a firmware interface database agent 110. The configuration manager 100 also includes a driver manager 112 that communicates with the configuration controller 102, for managing appropriate drivers in the pre-boot environment, which includes loading drivers after the computer 18 is powered on or after a system reset is performed, as well as stopping and restarting individual drivers when a user changes portions of their configuration data.

The term "hardware devices" is intended to be broadly interpreted, and as previously discussed, includes all types of input/output and other devices. Examples of hardware devices are Redundant Array of Independent Disk (RAID) controllers, video cards, audio cards, motherboard controllers, network interface controllers, hard drives, parallel ports, monitors, COM ports, LANs, 1394 devices, USB devices, PS/2 devices, service processors, keyboards, mice, pointing devices, etc.

Referring again to FIG. 3, the interrupt monitoring agent 106 monitors the computer 18 in the pre-boot environment for a user initiated interrupt of the boot process. For example, a user interrupt may be the activation of a 'hot key' or any key that indicates to the computer 18 that the user wants to access some configuration data (i.e. setup information) for one or more drivers. If the interrupt monitoring agent 106 detects a user initiated boot interrupt before the OS 30 is loaded, the request for the boot interrupt is communicated to the configuration controller 102. The user interface 104 may be used to present the user a set of configuration data for one or more drivers corresponding to one or more hardware devices. Through the user interface 104, the user is provided the ability to modify all or a portion of the set of configuration data for a given driver.

The firmware interface database agent 110, working with the configuration controller 102 and the driver manager 112, stores one or more sets of configuration data for one or more drivers. When the driver manager 112 initially loads a driver, a copy of the set of configuration data for the driver is stored by the interface database agent 110. If a user chooses to modify the configuration data for the driver before the OS 30 is loaded, the configuration controller 102 causes the interface database agent 110 to retrieve the copy of the configuration data and present it to the user via the user interface 104.

The driver manager 112, working in conjunction with the configuration controller 102, loads drivers from the NVRAM 46 and activates the drivers by invoking a start routine for each device that is part of or connected to the computer 18. Together, the configuration controller 102 and the driver manager 112 support the dynamic configuration of a plurality of drivers. The configuration controller 102 commands the driver manager 112 through a load service, a stop service, and a start service to stop a driver managing a particular device and restart the driver with a modified set of configuration data. In configuration management, the ability to dynamically configure a plurality of drivers is extremely useful and can minimize the need to perform a complete reset to a system.

Figure 4A:
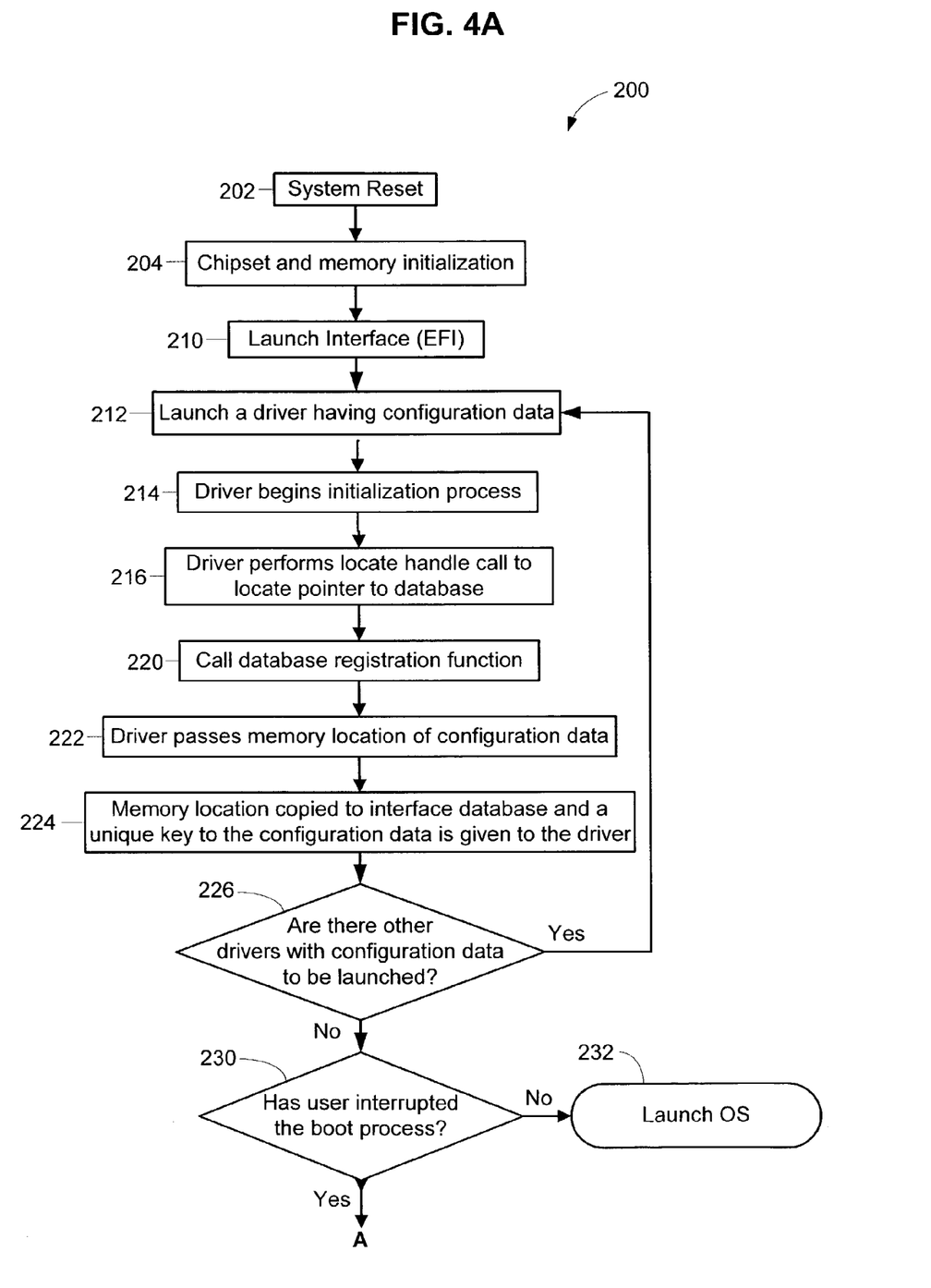
FIG. 4 is a flowchart illustrating some events to configure a hardware device in a pre-boot environment and determine if a system reset is required.
Figure 4B:
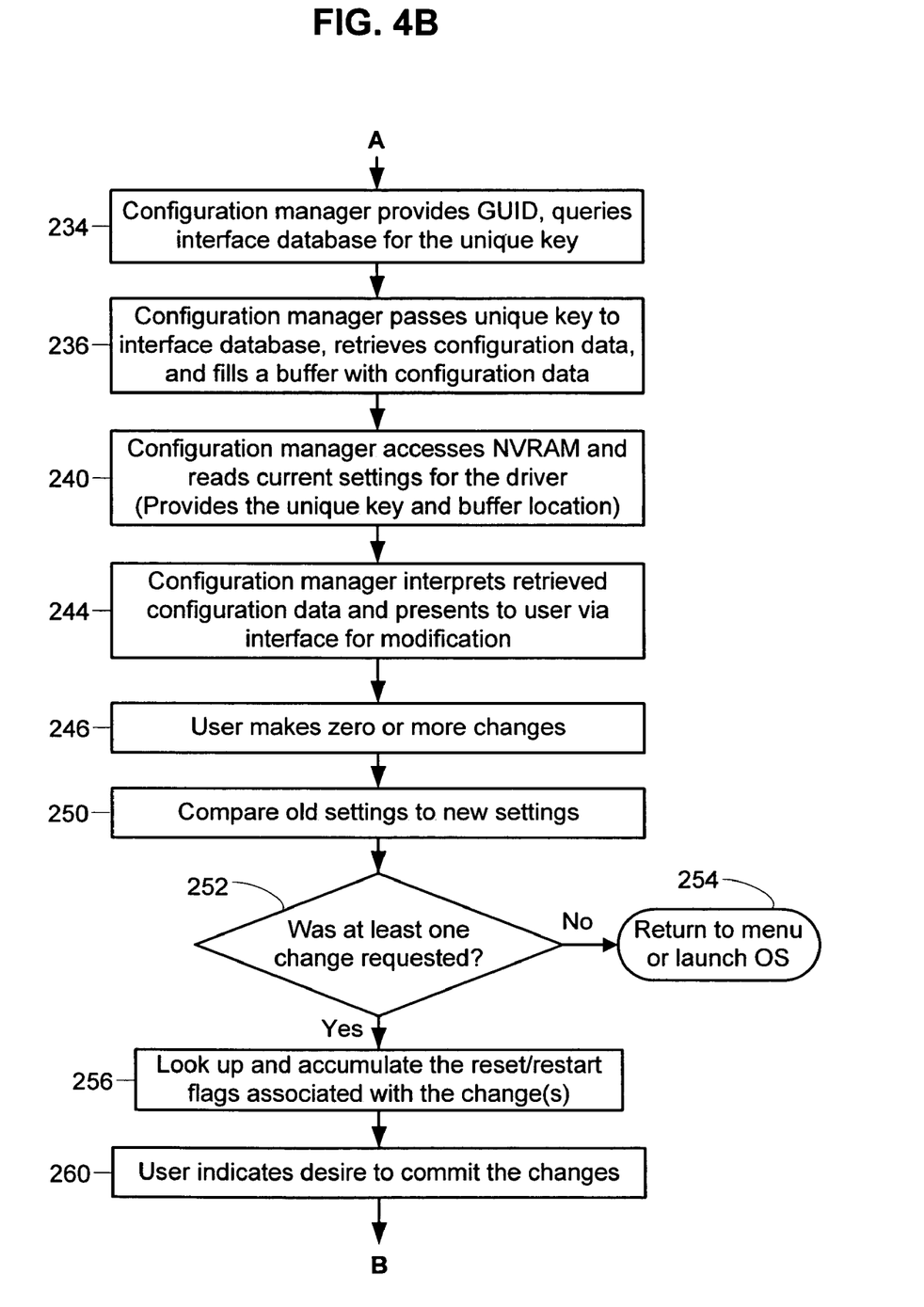
Figure 4C:
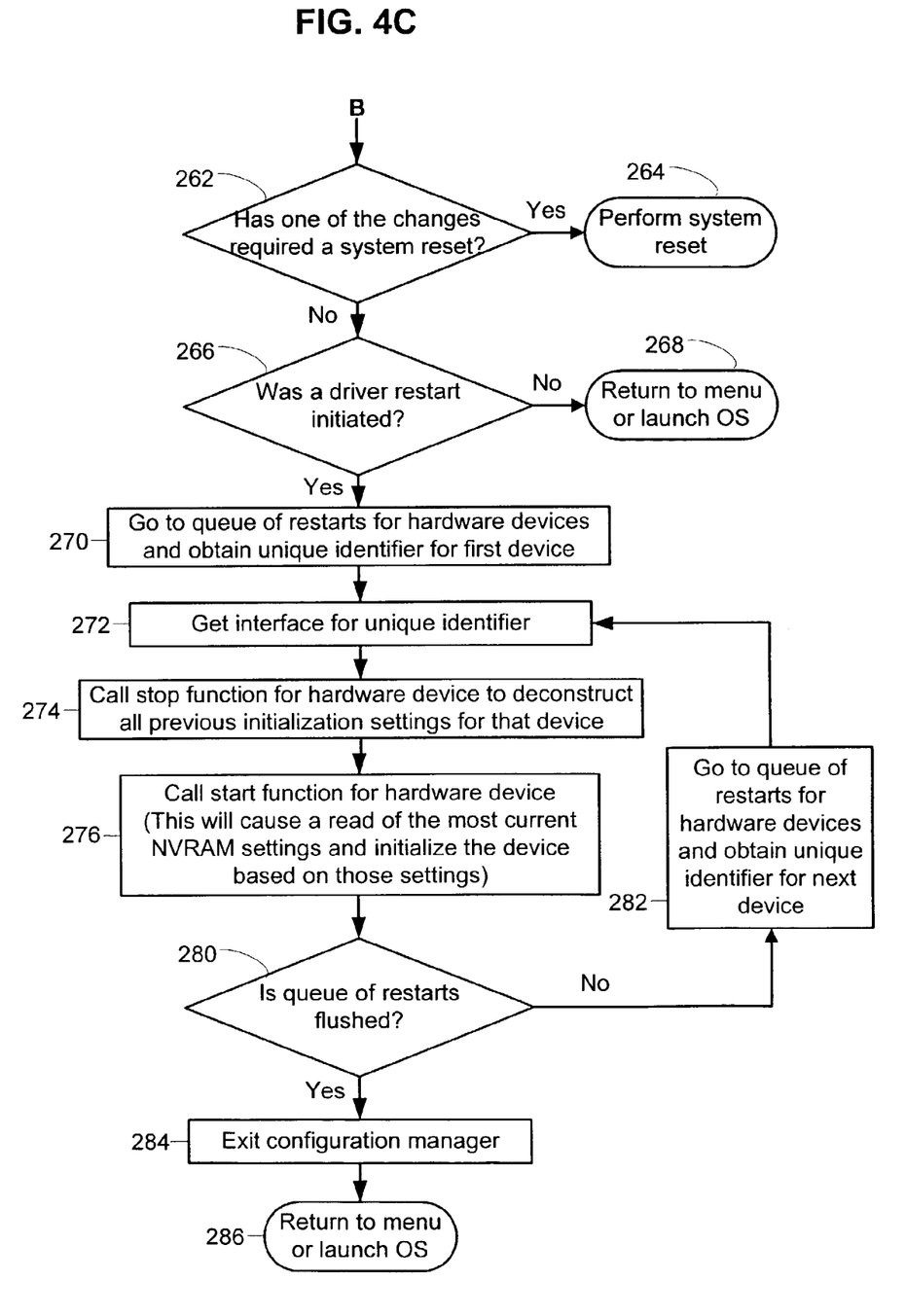

An embodiment of a software program for implementing the configuration manager 100 of FIG. 3 is shown in FIGS. 4A-C. In this embodiment, the program is for execution by the processor 40 and is embodied in software stored on a machine-accessible medium such as a CD-ROM, a floppy disk, a hard drive, a DVD, or a memory associated with the processor 40, but persons of ordinary skill in the art will readily appreciate that the entire program or parts thereof could alternatively be executed by a device other than the processor 40 and/or embodied in the firmware 12 or dedicated hardware in a well known manner. For example, any or all of the configuration controller 102, the user interface 104, the interrupt monitoring agent 106, the firmware interface database agent 110, and/or the driver manager 112 could be implemented by software, hardware, and/or firmware. Further, although the example program is described with reference to the flowcharts illustrated in FIGS. 4A-C, persons of ordinary skill in the art will readily appreciate that many other methods of implementing the configuration manager 100 of FIG. 3 may alternatively be used. For example, the order of many of the blocks may be changed, and/or some of the blocks described may be changed, eliminated, or combined.

Referring to FIG. 4A, the flowchart 200 illustrates a program to configure one or more hardware devices in a pre-boot environment without requiring a system reset. After a system reset (block 202) where the computer 18 is reset or turned on for the first time, a chipset and memory initialization is performed (block 204). The chipset and memory initialization typically includes providing access to one or more industry standard data buses.

Once the initial chipset and memory initialization has been performed, the computer's BIOS, which is stored in the nonvolatile memory 44, is launched to create published basic services. After the chipset and memory initialization, the interface 10, such as EFI for example, is launched (block 210). Part of the interface 10 that is launched is the configuration manager 100, such as the configuration manager 100 from FIG. 3, to dynamically manage one or more hardware devices and their corresponding drivers throughout the remainder of the pre-boot process. Once activated, the configuration manager 100 is capable of managing the hardware devices and drivers based on need, as events occur that affect the configuration of the devices and/or drivers. This dynamic management of the hardware devices and drivers is described in more detail below.

The configuration controller 102 of the configuration manager 100 then commands the driver manager 112 to begin the process of loading one or more interface drivers (block 212). As known to persons of ordinary skill in the art, loading a driver includes retrieving the driver from a non-volatile storage and relocating the retrieved driver to available memory. It should be noted that drivers, which are the control mechanisms for hardware devices, are typically compressed and stored in the nonvolatile memory 44 or embedded in the option-ROMs 24, until they are extracted and decompressed.

While the driver manager 112 may load several drivers, at least one of those drivers will include a set of configuration data therewith. This configuration data includes an interpretable byte stream of data which signifies the type of questions to ask a user that are associated with certain attributes of the driver. As discussed below, these questions are presented to the user via the user interface 104 and include questions such as, for example: Is the question a check box?; Is the question a multi-choice pull-down question?; Is the question a manual string entry?; Is the question a numeric entry?; etc. Additionally, the configuration data includes a flag setting which signifies whether a change to a particular attribute requires a system reset, a restart of the particular driver, or no action at all. The configuration data also includes the strings associated with the questions and a handle (i.e. interface) to the driver.

Once the driver manager 112 calls the entry point for the driver, the driver manager 112 begins the driver's initialization process (block 214). As part of the driver's initialization, the driver manager 112 performs a locate handle call to locate a pointer to a firmware interface database (block 216). The firmware interface database is controlled by the configuration controller 102 and the firmware interface database agent 110. By performing the handle call, the firmware interface database agent 110 looks for a unique identifier (GUID) associated with the firmware interface database that is a pointer to the database that allows direct access to the database. The configuration controller 102 then calls a database registration function (block 220) that provides a pointer (i.e., memory location) to the portions of the driver that correspond to the configuration data for that driver. It is these portions of the configuration data that are exported to the firmware interface database.

The driver manager 112 then passes to the configuration controller 102 a starting memory location to the configuration data (block 222). The firmware interface database agent 110 then copies the memory location to the firmware interface database and provides the driver with a unique key or a handle to the configuration data (block 224).

The configuration manager 100 then checks to see if there are other drivers with configuration data that are to be launched (block 226), and if so, returns to the block 212 to launch those drivers. Those of ordinary skill in the art will appreciate that a plurality of drivers may be launched simultaneously, as opposed to the consecutive process shown in this embodiment. If it is determined at the block 226 that no other drivers with configuration data need to be launched, the controller 102 may cause a splash screen to be presented to the user to provide instructions on interrupting the boot process to access and modify the configuration data.

The interrupt monitoring agent 106 monitors the computer 18 for a user initiated interrupt of the boot process. If it is determined at a block 230 that the user did not interrupt the boot process, the firmware interface 10 proceeds with booting the OS 30 (block 232).

Referring to FIG. 4B, if the interrupt monitoring agent 106 detects an interrupt signal from the user before the OS 30 is loaded, the configuration controller 102 causes the user interface 104 to display a menu of options to the user to allow the user to select a driver to modify. For example, the user may select from the menu the configuration data for the motherboard driver to modify. The configuration controller 102 then provides the firmware interface database the unique identifier (GUID) corresponding to the hardware device and the firmware interface database agent 110 queries the firmware interface database for the unique key (i.e., handle) (block 234). The configuration controller 102 also allocates a block of memory as a buffer and provides the firmware interface database agent 110 the location of the buffer.

After the firmware interface database is queried, the firmware interface database agent 110 performs a retrieve function from the firmware interface database to obtain the original data that was exported by the driver on its initialization (block 236). The firmware interface database agent 110 then retrieves the information associated with the handle and fills the buffer that was provided by the configuration controller 102 with the corresponding information. The configuration controller 102 then accesses the NVRAM 46 directly, or an interface to the controller's non-volatile storage, and retrieves the current settings, which may be the default settings, associated with the driver (block 240). In other words, the configuration controller 102 will retrieve whatever the last settings that were enacted for the driver.

The configuration controller 102 interprets the retrieved configuration data and presents it to the user via the user interface 104 (block 244). At this stage, the pertinent questions are presented to the user to allow modification of the configuration data for the driver. While not necessary, the user will most likely make one or more changes to the configuration data for the driver (block 246). If the user does not modify any portion of the configuration data, the configuration controller 102 may prompt the user to exit the user interface 104 to allow the OS 30 to be loaded. To determine if a change was made to the configuration data, the configuration controller 102 compares the old settings for the driver to the newly modified settings (block 250).

If it is determined at the block 252 that no changes were requested by the user, the configuration controller 102 returns the user to the menu or causes the OS 30 to continue loading (block 254). If it is determined at the block 252 that one or more changes were requested, the firmware interface database agent 110 will look up and accumulate the reset/restart flags associated with the changes (block 256). The configuration controller 102 may confirm with the user his desire to commit the changes (block 260) to provide an opportunity to keep the configuration data as it was previously set. The firmware interface database agent 110 analyzes the reset/restart flags to determine if any of them indicate that a system reset is required. In other words, the firmware interface database agent 110 performs a logical OR function on the data represented by the flags to determine if any one of them requires a system reset.

Referring to FIG. 4C, if it is determined that a system reset is required (block 262) the configuration controller 102 will cause a system reset to be performed on the computer 18, re-initializing all of the drivers (block 264). The configuration controller 102 additionally saves the configuration modifications in the NVRAM 46. Those of ordinary skill in the art will understand that most changes to hardware devices' configuration data do not require system resets. If it is determined that a system reset is not required, the firmware interface database agent 110 analyzes the reset/restart flags to determine if any of them indicate that a driver restart is required. If it is determined (block 266) that the changes to the configuration data did not require a driver to be restarted, the configuration controller 102 returns the user to a menu or causes the OS 30 to continue loading (block 268).

If it is determined that one or more driver restarts are required, the configuration controller 102 builds a queue for the driver restarts for their corresponding hardware devices and obtains the unique identifiers (e.g., GUIDs) for those drivers from the firmware interface database (block 270). The firmware interface database agent 110 provides an interface corresponding to the unique identifiers (block 272). The driver manager 112 then re-initializes the appropriate drivers.

The re-initialization of the drivers is performed by the configuration controller 102 causing the driver manager 112 to call a stop function for the hardware device to deconstruct all previous initialization settings for that device (block 274). The deconstruction includes flushing all queues, flushing any settings and anything associated with its previous operations. The driver manager 112 then calls a start function for the same hardware device by reading the most current NVRAM settings for the device and initializing the driver based on those settings (block 276). The configuration controller 102 then communicates with the firmware interface database agent 110 to determine if there are any driver restarts remaining in the restart queue that need to be restarted.

If it is determined at the block 280 that one or more driver restarts remain in the restart queue, the configuration controller 102 returns to the firmware interface database to obtain the unique identification for the next device in the restart queue (block 282). Once the configuration controller 102 and the driver manager have re-initialized all of the appropriate drivers, the configuration manager 100 stops (block 284) and the user is returned to a menu, or the OS 30 continues loading until it is fully operational (block 286).

Persons of ordinary skill in the art will appreciate that the disclosed teachings can alternatively be applied to dynamically manage other devices in the pre-boot environment. The interrupt monitoring agent 106 continues to monitor the computer for user initiated interrupts as long as an operating system has not yet launched. Once an operating system is launched, the interface 10, including the configuration manager 100, may be terminated. If a developer chooses not to launch an operating system, for any of a variety of reasons, the interface 10 may continue to function to provide a unique operational environment that offers a command line interface (similar to DOS) that allows, for example, a number of diagnostic tools to be performed. Yet another alternative example could include launching an operating system and terminating the majority of the interface functions, but keeping one or more functions active. As an example, the interface's runtime services could remain active, so that the platform firmware sets and maintains the time for the computer.

As described with relation to the foregoing example, the configuration manager 100 allows an OS and platform firmware (any software that is included in ROM) to communicate information necessary to support the OS boot process, thereby minimizing the investment of resources. The configuration manager 100 permits a standard shrink-wrap OS intended to run on a hardware platform to boot on a variety of system designs without additional platform or OS customization. This allows for platform innovation to introduce new features and functionality that enhance platform capability without requiring new code to be written in the OS boot sequence. In other words, the platform and OS are able to evolve and innovate independently of one another. Furthermore, the examples discussed above permit developers to design the interface so that it is compatible with a range of underlying hardware devices functions without having explicit knowledge of the specifics for each device in the range.

Although certain apparatus and methods implemented in accordance with the teachings of the patent have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of configuring a hardware device prior to loading an operating system comprising:
    loading a driver having a set of configuration data from a nonvolatile storage medium, prior to loading the operating system;
    monitoring for a user initiated modification to the set of configuration data, prior to loading the operating system;
    matching the user initiated modification to at least one of a plurality of system reset or re-initialization flags; and
    determining if the at least one system reset or re-initialization flag indicates that the matching modification to the set of configuration data requires a system reset or a re-initialization of the driver, prior to loading the operating system.

2. A method as defined in claim 1, further comprising calling a stop function for the hardware device to deconstruct all previous configuration settings for the hardware device if it is determined that the modification to the set of configuration data requires a re-initialization of the driver.

3. A method as defined in claim 2, further comprising calling a start function to re-initialize the hardware device based on the modification to the set of configuration data.

4. A method as defined in claim 1, further comprising performing the system reset if it is determined that the modification to the set of data requires the system reset.

5. A method as defined in claim 1, further comprising launching a firmware interface prior to loading the driver.

6. A method as defined in claim 1, further comprising determining if the modification to the set of configuration data requires neither the system reset nor the re-initialization of the driver.

7. A method as defined in claim 1, further comprising copying the set of configuration data for the driver to a firmware interface database.

8. A method as defined in claim 1, wherein determining if the modification to the set of configuration data requires a system reset or a re-initialization of the driver comprises comparing the set of configuration data for the driver to a modified set of configuration data for the driver.

9. A method as defined in claim 1, wherein determining if the modification to the set of configuration data requires the system reset or the re-initialization of the driver comprises setting a flag to indicate whether the modification to the set of configuration data requires the system reset or the re-initialization of the driver.

10. A method as defined in claim 1, wherein monitoring for the user initiated modification comprises prompting the user to modify a portion of the set of configuration data.

11. A method as defined in claim 1, further comprising creating a queue of re-initializations to stop and restart a plurality of drivers.

12. A method as defined in claim 1, further comprising monitoring for a plurality of user initiated modifications to one or more sets of configuration data;
    determining if the modifications to the sets of configuration data require the system reset or the re-initialization of one or more drivers, prior to loading the operating system; and performing the system reset if any of the plurality of modifications required the system reset.

13. A method as defined in claim 1, wherein loading the driver comprises retrieving the driver from the nonvolatile storage medium and relocating the driver to a RAM.

14. The method of claim 1, wherein determining if the at least one system reset or re-initialization flag indicates that the modification to the set of configuration data requires a system reset or a re-initialization of the driver, prior to loading the operating system includes performing a logical OR function on a set of data including the modification to the set of configuration data and the at least one system reset or re-initialization flag.

15. A method of configuring a hardware device prior to loading an operating system comprising:
    loading a driver having a set of configuration data from a nonvolatile storage medium, prior to loading the operating system;
    monitoring for a user initiated modification to the set of configuration data, prior to loading the operating system;
    matching the user initiated modification to at least one of a plurality of system reset or re-initialization flags;
    determining if the at least one system reset or re-initialization flag indicates that the matching modification to the set of configuration data requires a system reset or a re-initialization of the driver, prior to loading the operating system;
    calling a stop function for the hardware device to deconstruct all previous configuration settings for the hardware device if it is determined that the modification to the set of configuration data requires a re-initialization of the driver, prior to loading the operating system;
    calling a start function to re-initialize the hardware device based on the modification to the set of configuration data if it is determined that the modification to the set of configuration data requires a re-initialization of the driver, prior to loading the operating system; and
    performing the system reset if it is determined that the modification to the set of data requires the system reset, prior to loading the operating system.

16. A method as defined in claim 15, further comprising launching a firmware interface prior to loading the driver.

17. A method as defined in claim 15, further comprising copying the set of configuration data for the driver to a firmware interface database.

18. A method as defined in claim 15, wherein determining if the modification to the set of configuration data requires a system reset or a re-initialization of the driver comprises comparing the set of configuration data for the driver to a modified set of configuration data for the driver.

19. A method as defined in claim 15, wherein determining if the modification to the set of configuration data requires the system reset or the re-initialization of the driver comprises setting a flag to indicate whether the modification to the set of configuration data requires the system reset or the re-initialization of the driver.

20. A method as defined in claim 15, wherein monitoring for the user initiated modification comprises prompting the user to modify a portion of the set of configuration data.

21. A method as defined in claim 15, further comprising creating a queue of re-initializations to stop and restart a plurality of drivers.

22. A method as defined in claim 15, further comprising monitoring for a plurality of user initiated modifications to one or more sets of configuration data;
    determining if the modifications to the sets of configuration data require the system reset or the re-initialization of one or more drivers, prior to loading the operating system; and
    performing the system reset if any of the plurality of modifications required the system reset.

23. For use in a computer having a processor, a pre-boot configuration manager apparatus comprising:
a controller;
an interrupt monitoring agent in communication with the controller to monitor the computer before an operating system is loaded;
a driver manager in communication with the controller to load a driver before the operating system is loaded;
a firmware interface database agent in communication with the controller to store a set of configuration data for the driver before the operating system is loaded;
a reset or re-initialization flag database agent in communication with the firmware interface agent to store a plurality of flags before the operating system is loaded; and
a user interface in communication with the controller to provide a user with an option to modify the set of configuration data before the operating system is loaded;
wherein the controller is configured to match at least one of the plurality flags with a modification to the set of configuration data to determine if the at least one flag indicates that the matching modification to the set of configuration data requires a system reset or a re-initialization of the driver.

24. An apparatus as defined in claim 23 wherein the interrupt monitoring agent monitors the computer for a user initiated interrupt of the boot process.

25. An apparatus as defined in claim 23 wherein the driver manager loads the driver from a nonvolatile storage medium.

26. An apparatus as defined in claim 23 wherein the driver manager deconstructs all previous configuration settings for the hardware device and re-initializes the hardware device, if it is determined that the modification to the set of configuration data requires a re-initialization of the driver.

27. An apparatus as defined in claim 23 wherein the controller performs a system reset if it determines that the modification to the set of data requires the system reset.

28. An article comprising a machine-accessible medium having stored thereon instructions that, when executed by a machine prior to loading an operating system, cause the machine to:
load a driver of a hardware device, the driver having a set of configuration data from a nonvolatile storage medium, prior to loading the operating system;
monitor for a user initiated modification to the set of configuration data, prior to loading the operating system;
determine, prior to loading the operating system, if the modification to the set of configuration data requires a system reset or a re-initialization of the driver; and
create a queue of re-initializations to stop and restart a plurality of drivers.

29. The article of claim 28 having further instructions that, when executed by the machine, cause the machine to call a stop function for the hardware device to deconstruct all previous configuration settings for the hardware device if it is determined that the modification to the set of configuration data requires the re-initialization of the driver.

30. The article of claim 29 having further instructions that, when executed by the machine, cause the machine to call a start function to re-initialize the hardware device based on the modification to the set of configuration data.

31. The article of claim 28 having further instructions that, when executed by the machine, cause the machine to perform the system reset if it is determined that the modification to the set of data requires the system reset.

32. The article of claim 28 having further instructions that, when executed by the machine, cause the machine to launch a firmware interface prior to loading the driver.

33. The article of claim 28 having further instructions that, when executed by the machine, cause the machine to determine if the modification to the set of configuration data requires neither the system reset nor the re-initialization of the driver.

34. The article of claim 28 having further instructions that, when executed by the machine, cause the machine to copy the set of configuration data for the driver to a firmware interface database.

35. The article of claim 28 having further instructions that, when executed by the machine, cause the machine to compare the set of configuration data for the driver to a modified set of configuration data for the driver.

36. The article of claim 28 having further instructions that, when executed by the machine, cause the machine to set a flag to indicate whether the modification to the set of configuration data requires the system reset or the re-initialization of the driver.

37. The article of claim 28 having further instructions that, when executed by the machine, cause the machine to monitor for a plurality of user initiated modifications to one or more sets of configuration data;
determine if the modifications to the sets of configuration data require the system reset or the re-initialization of one or more drivers, prior to loading the operating system; and
perform the system reset if any of the plurality of modifications required the system reset.

* * * * *